Jan. 23, 1968   J. H. SHELLEY   3,365,635
OSCILLATING MOTOR FOR HOROLOGICAL INSTRUMENTS
Filed Oct. 16, 1964   4 Sheets-Sheet 1
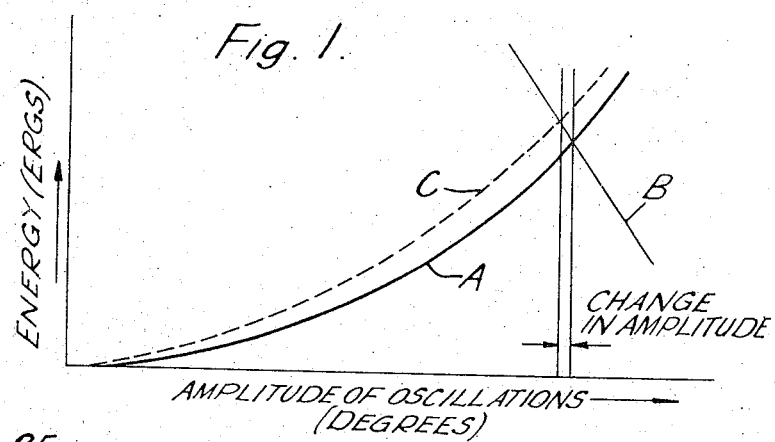
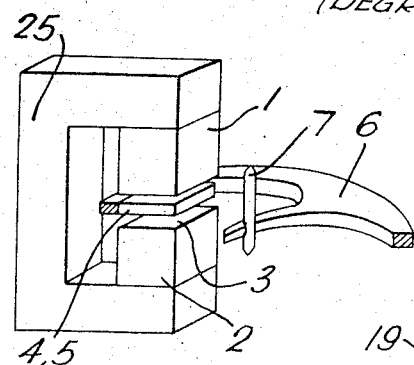
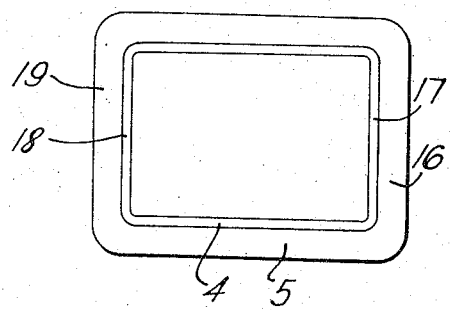
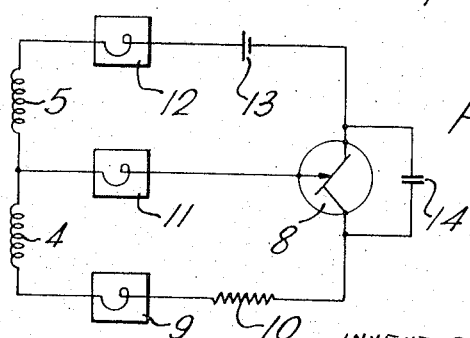
INVENTOR:
JOHN HENRY SHELLEY
ATTORNEYS:
Wall, Pollack + Vande Sande Jan. 23, 1968    J. H. SHELLEY    3,365,635
OSCILLATING MOTOR FOR HOROLOGICAL INSTRUMENTS
Filed Oct. 16, 1964    4 Sheets-Sheet 2

INVENTOR:
JOHN HENRY SHELLEY

ATTORNEYS:
Hall, Pollock & Vande Sande

INVENTOR:
JOHN HENRY SHELLEY
ATTORNEYS:
Hall, Pollock + Vonde Sande

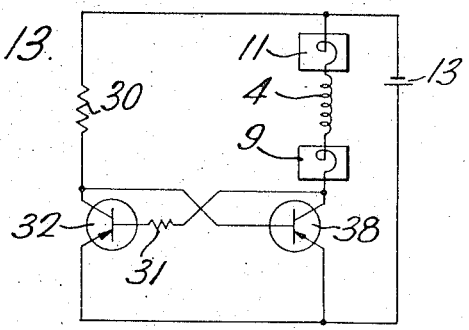

United States Patent Office 3,365,635
Patented Jan. 23, 1968

3,365,635
OSCILLATING MOTOR FOR HOROLOGICAL INSTRUMENTS
John Henry Shelley, Eastcombe, near Stroud, England, assignor to S. Smith & Sons (England) Limited, London, England, a British company
Filed Oct. 16, 1964, Ser. No. 404,424
Claims priority, application Great Britain, Oct. 17, 1963, 41,136/63
10 Claims. (Cl. 318—128)

This invention relates to horological instruments.

Horological instruments have been proposed in which one or more coils is or are mounted on an oscillating member such as a balance or a pendulum which is subjected to a restoring force (produced by a spring or by gravity) substantially proportional to the displacement of the oscillating member from a datum position, and is or are arranged to pass through a region of magnetic flux. The E.M.F. induced in the coil or in one of the coils as it passes through the region of magnetic flux is applied to a circuit incorporating one or more transistors. The circuit in response to the applied E.M.F. drives a current through the coil or one of the coils which interacts with the flux to produce a force in the sense to maintain the oscillations of the oscillating member. The current opposes the E.M.F. induced in the coil through which the current flows so that the potential difference across that coil is increased. The energy required to maintain the oscillations of the oscillating member is supplied by a direct voltage source associated with the circuit. The oscillating member drives conventional time indicating means and in the case of a balance may conveniently do so through an escapement and a gear train. Such horological instruments will be referred to as "of the kind described." By the term "drive coil" is meant the coil through which the said current flows whether or not it is the only coil. By the term "trigger coil" is meant the coil in which the E.M.F. applied to the circuit is induced but through which the said current does not flow.

According to this invention there is provided a horological instrument of the kind described wherein, in operation, the E.M.F. induced in the drive coil is at least one half of the potential difference across the direct voltage source.

The direct voltage source will normally be a battery but may be a portion of the potential difference across an accumulator, the potential difference of the accumulator being reduced by a chain of resistors.

Preferably the E.M.F. induced, in operation, in the drive coil is at least two thirds of the potential difference across the direct voltage source.

An approximate theoretical expression for the energy input to a horological instrument of the kind described may be derived theoretically as follows.

Let V be the potential difference across the drive coil during the period the said current is passing through it (volts). It may be assumed that V is the potential difference across the direct voltage source.
E be the E.M.F. induced in the drive coil (volts).
I be the current flowing in the drive coil (amps).
R be the total resistance of the drive coil circuit (ohms).
T be the duration of the current flowing through the drive coil (secs.).
W be the energy input per impulse (ergs).
A be the amplitude of the oscillation of the oscillating member (degrees).

Then $$V = E + IR \text{ and } I = \frac{V-E}{R}$$

$$VI = EI + I^2R$$

Now VI is the total energy supplied by the D.C. voltage source, $I^2R$ is the electrical loss, and EI is the mechanical power supplied to the instrument. Thus the energy input W, during the passage of the coil or coils through the said region is, $W = EIT \times 10^{-7}$ $$W = EIT \times 10^{-7} = \frac{ET(V-E)}{R} \times 10^{-7}$$

ergs per impulse.

Now E is proportional to the velocity of the coil or coils through the region. The velocity of the coil or coils is proportional to the amplitude A so that E is proportional to A. T is inversely proportional to the velocity of the coils and is therefore inversely proportional to A so that the product ET is independent of the amplitude A.

Thus $W = I \times$ a constant
But $$I = \frac{(V-E)}{R}$$

Now let $E = kA$ where $k =$ a constant.
Therefore $W = (V - kA) \times$ a constant.

Thus in a horological instrument of the kind described, the energy input per impulse declines with increase of amplitude, at a rate which depends upon the value of the constant $k$, i.e. upon the ratio of the voltage induced in the drive coil, to the amplitude of oscillation of the oscillating member.

The energy requirement of a horological instrument of the kind described is dependent upon the amplitude of oscillation of the oscillating member and increases with an increase in amplitude. The amplitude of oscillation of the oscillating member reaches an equilibrium in which the energy supplied to the oscillating member is equal to the energy requirements of the horological instrument. If the energy requirement changes with such factors as age or the orientation of the insturment, the amplitude of the oscillation changes, and these amplitude changes invariably cause errors in timekeeping.

In a horological instrument in accordance with this invention a change in the amplitude of oscillation of the oscillating member due to a change in the energy requirement of the horological instrument is reduced as W, the energy input per impulse, undergoes a comparatively large change with a change in amplitude. This is illustrated in FIGURE 1 where curve A shows the normal energy requirement, curve C shows an increased energy requirement and curve B shows the energy input. It will be seen that B is relatively steep so that a small change in the amplitude of oscillation gives a large change in the energy input per impulse.

In a horological instrument in accordance with this invention, the requirement that the value of the ratio $E/V$ shall be as large as possible, is in conflict with the necessity for supplying sufficient energy to maintain the stable operating amplitude A. This is because the mathematical expression for W contains the term $(V-E)$.

It is apparent however from a consideration of the expression, $$W = E(V-E)\frac{T}{R} \times 10^{-7}$$

ergs per impulse that small values of $(V-E)$ can be tolerated provided that the value of $T/R$ can be suitably adjusted, i.e., the impulse must be sustained for a longer time and the coil resistance must be kept low.

Preferably therefore if the drive coil rotates about an axis of rotation, the path of the coil through the said region subtends an angle of at least 20° about the axis of rotation.

Preferably the path of the drive coil through the said region subtends an angle of at least 50° about the axis of rotation.

This has the advantage that a comparatively long impulse is obtained (i.e. T is large). A further advantage is that a drive coil having limbs which are comparatively wide in the direction of its motion through the said region may be used. Such a coil has a comparatively low resistance (i.e. R is small).

Designs based on a high flux density in the said region enable a suitably large value of induced back E.M.F. to be obtained from a relatively low resistance coil.

Preferably therefore the average flux density over the said region is at least 4000 gauss.

If the horological instrument comprises a trigger coil the drive coil may surround the trigger coil in the plane of their motion through the said region.

In this case, an E.M.F. is only induced in the leading limb of the trigger coil and a voltage signal is only applied to the drive coil when the leading limb of the drive coil is within the said region.

If the horological instrument comprises a trigger coil the trigger and drive coils may have a common terminal and in this case three connections are made from the external circuit to the oscillating member through three hairsprings.

In a preferred arrangement one hairspring has a stiffness such that it regulates the motion of the oscillating member and the stiffnesses of the other two hairsprings are such that they have comparatively little effect on the motion of the oscillating member.

Alternatively, when the instrument comprises a trigger coil, all the components of the electrical circuit other than the D.C. voltage source are mounted on the oscillating member and in this case two connections are made from the D.C. voltage source to the circuit on the oscillating member through two hairsprings. In this arrangement the stiffness of one of the hairsprings is preferably so small that it has comparatively little effect on the motion of the oscillating member.

In another arrangement when the horological instrument comprises a trigger coil all the components of the electrical circuit including the D.C. voltage source are mounted on the oscillating member. No electrical connections are made through hairsprings and the motion of the oscillating member is regulated in the conventional way by a single hairspring.

In one preferred embodiment, a separate trigger coil is not provided and the circuit only drives current through the drive coil when the potential difference across it exceeds a predetermined value and only when it exceeds that value.

Now since E is greater than V/2 (using the notation already defined) in a horological instrument in accordance with this invention, E must be greater than IR, so that if E is greater than the predetermined value and if that value is greater than IR then current will cease to flow through the coil when it leaves the region of magnetic flux.

Preferably the drive coil is connected as a load of a first transistor and the potential difference across the drive coil is applied to a second transistor which controls the flow of current through the first transistor.

A horological instrument will be described with reference to the accompanying drawings.

In the drawings:

FIGURE 1 is a graph of the energy requirements and the output of any horological instrument of the kind described.

FIGURE 2 is a pictorial view of part of the horological instrument showing an assembly of magnets and a balance wheel (this drawing is not to scale).

FIGURE 3 is a circuit diagram of the horological instrument.

FIGURE 4 shows the layout of the coils.

FIGURES 13, 14 and 15 show further alternative circuit diagrams which use one coil.

FIGURE 16 shows waveforms of the E.M.F. induced in, and the currents flowing in, the coil of the instrument when it has one of the circuits shown in FIGURES 13, 14 and 15, under various conditions.

FIGURE 17 shows the waveforms of the E.M.F. induced in, and the currents flowing in, a coil of the instrument when it has one of the circuits shown in FIGURES 3, 9 and 10 under the same conditions as FIGURE 16.

Figure 5:
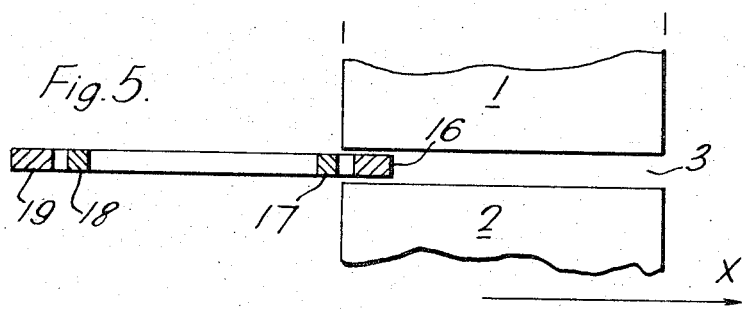
FIGURES 5 and 6 show the coils in different positions.

Referring to FIGURE 2, two similar permanent magnets 1 and 2 are disposed on opposite sides of a gap 3, the faces of the magnets 1 and 2 on opposite sides of the gap 3 being magnetic poles of opposite polarity. The faces of the magnets 1 and 2 distant from the gap 3 are joined by a member 25 constructed from a high saturation flux density material such as one of the materials sold under the trade names "VPermendur" and "Supermendur." The magnets 1 and 2 may be constructed from one of the crystal orientated aluminum-nickel-cobalt-copper-iron alloys sold under the trade names of "Ticonal GX" and "Columax." Coils 4 and 5 mounted on a balance wheel 6 which is carried on a staff 7 pass, in operation, through the gap 3. The average flux density in the gap 3 is 5000 gauss and the length of the path of the coils 4 and 5 through the gap 3 subtends an angle of over 70° about the axis of the staff 7.

Referring now to FIGURE 3 one end of the coil 4 is connected to the base of a transistor 8 through a hairspring 9 and a resistor 10 in series. The other end of the coil 4 is connected to the emitter of the transistor 8 through a hairspring 11 and to one end of the coil 5. The other end of the coil 5 is connected to the collector of the transistor 8 through a hairspring 12 and a battery 13 in series. The base of the transistor 8 is connected to its collector by a capacitor 14. The transistor 8, the resistor 10, the battery 13 and the capacitor 14 are fixed in the horological instrument. The hairsprings 9, 11 and 12 regulate the motion of the balance wheel 6, the stiffness of the hairspring 9 being much greater than those of the hairsprings 11 and 12. The hairsprings 9, 11 and 12 are arranged so that the coils 4 and 5 are in the center of the gap 3 when they are at rest.

In use, the coils 4 and 5 on the balance wheel 6 oscillate and pass through the gap 3. When they are outside the gap 3, the transistor 8 is biased "OFF" and no current flows through the coil 5. When the coils 4 and 5 enter the gap 3 E.M.F.'s are inducted in both coils. The E.M.F. which is induced in the coil 4 is sufficient to bias the transistor 8 "ON" and a voltage signal is applied across the coil 5 so that current flows through it and this current interacts with the flux in the gap 3 to produce a force which is in the sense to maintain the oscillations. The voltage signal applied across the coil 5 is substantially the same as the potential difference across the terminals of the battery 13. The E.M.F. induced in the coil 5 opposes the voltage signal and its magnitude is about 75% of that of the voltage signal. The energy required to drive conventional indicating means is derived from the balance wheel through an escapement.

The capacitor 14 serves to inhibit high frequency oscillations and its capacitance is too small to affect the operation of the circuit.

As has previously been explained, the energy requirement of a horological instrument is dependent on the amplitude of the oscillations of the balance wheel 6 and this is illustrated in curve A in FIGURE 1. The energy supplied to the balance wheel 6 is illustrated in curve B in FIGURE 1. As has previously been explained, the greater the change of the energy input with a change of the amplitude of oscillation, that is to say the nearer the slope of the curve B to the vertical, the smaller is the change in timekeeping of the horological instrument due to alterations in the energy requirement of the instrument. Such a change is illustrated in curve C and might occur due to changes in viscosity of the oil used to lubricate the instrument. The horological instrument is designed so that the normal operating amplitude of the oscillations of the balance wheel is 220°. It is known in the art of horology that changes in timekeeping due to poise error combined with attitude changes are least when the amplitude of the oscillations of the balance wheel is 220° It will be seen that because curve B is relatively steep a change in the energy requirement of the instrument gives a small change in the amplitude of the oscillations of the balance wheel.

Referring now to FIGURE 4, the coil 5 completely surrounds the coil 4 in the plane of their motion through the gap 3. The limb of the coil 5 is comparatively wide in the plane of its motion through the gap 3 so that its resistance is comparatively low. The width of the limb of the coil 5 is permitted by the wide gap 3.

Figure 6:
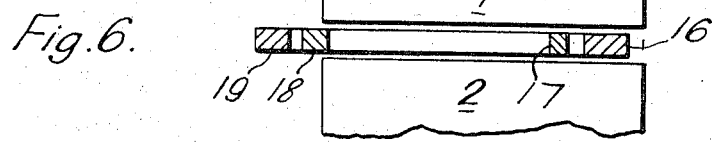
Figure 7:
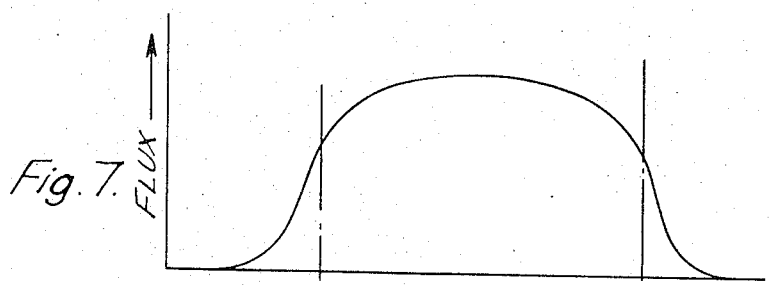
FIGURE 7 is a graph of flux density in a region in the instrument.

Referring to FIGURES 5, 6, 7 and 8 a graph of flux density across the gap 3 is shown in FIGURE 7. The graphs of the E.M.F.'s induced in the leading and lagging limbs of the coils 4 and 5 have the same shape but are to different scales. The position of the coils 4 and 5 when the E.M.F. induced in the leading limb 17 of the coil 4 is sufficient to bias the transistor 8 "ON" is shown in FIGURE 5 and it will be seen that the leading limb 16 of the coil 5 is then within the gap. The position of the coils 4 and 5 when the E.M.F. induced in the lagging limb 18 of the coil 4 is sufficient to reduce that induced in the limb 17 to the extent that transistor 8 is no longer biased "ON," is shown in FIGURE 6 and it will be noted that the limb 16 is still within the gap 3. Current therefore only flows through the coil 5 when it is within a region of high flux density. A graph of the current flowing through the coil 5 is shown in curve E in FIGURE 8 and it will be noted that the curve has small "ears" 19 and 20 which correspond to the positions of the limb 16 in the gap when the flux density is below the maximum. The average current is proportional to average value of voltage signal applied to the coil minus the average E.M.F. induced in it. The lower the average value of the current the nearer is the curve B in FIGURE 1 to the vertical.

Figure 8:
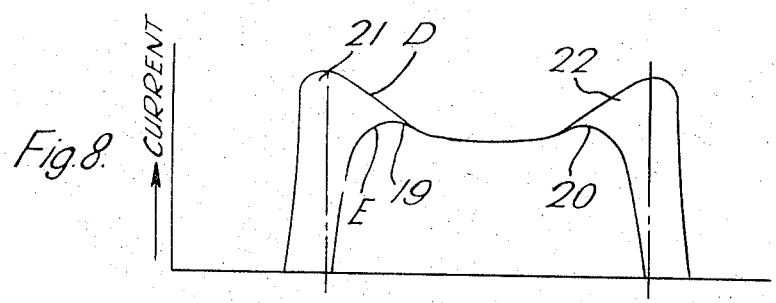
FIGURE 8 shows graphs of currents flowing in one of the coils.

A graph of the current flowing in the coil 5 if the coils 4 and 5 are wound on top of each other, is shown in curve D in FIGURE 8 and it will be seen that the curve has two large "ears" 21 and 22. The average current flowing in the coil 5 is increased. In certain circumstances it may be desirable to increase slightly the size of one or both of the "ears" 19 and 20. This may be achieved by reducing the flux density at one or both ends of the gap 3 by, for example, cutting off the corners of the magnets 1 and 2 or by adjusting the size of the coils 4 and 5 so that when the lagging limb of the coil 4 enters the gap 3 the leading limb of the coil 5 is already within a region of relatively low flux density.

Figure 9:
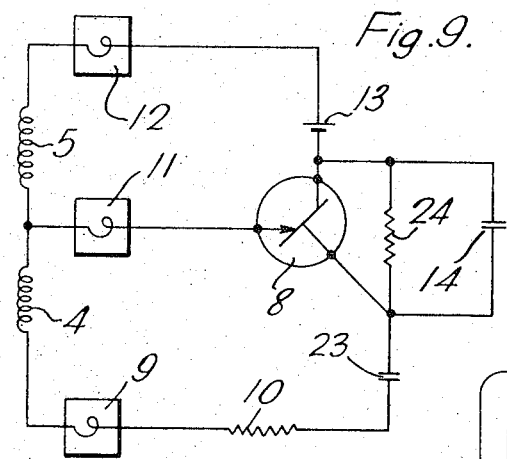
FIGURES 9 and 10 show circuit diagrams alternative to that of FIGURE 3.
Figure 10:
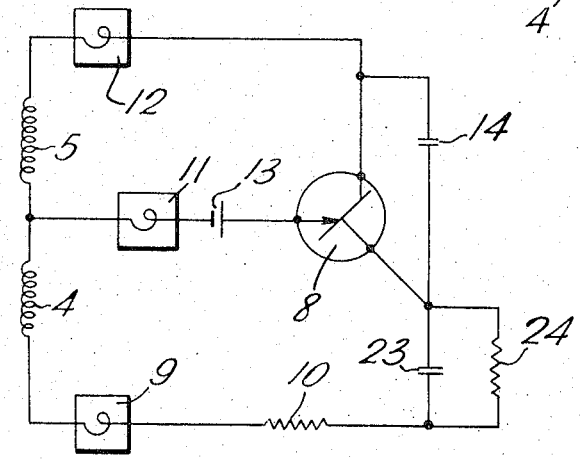

It will be appreciated that the operation of the circuit is similar when the coils 4 and 5 are moving in the opposite direction and the limbs 18 and 19 are the leading limbs of the coils 4 and 5 respectively. Alternative circuit diagrams are shown in FIGURES 9 and 10 which incorporate a capacitor 23 and a resistor 24. The operation of these circuits is basically the same as that shown in FIGURE 3 and is described in detail in French Patent No. 1,389,966.

Figure 11:
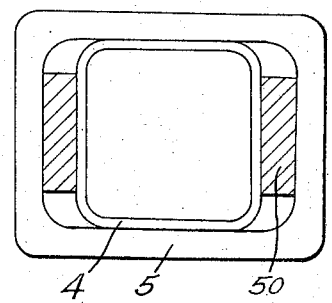
FIGURES 11 and 12 show layouts of the coils alternative to those of FIGURE 4.
Figure 12:
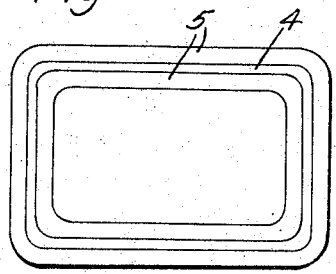

Alternative layouts of the coils are shown in FIGURES 11 and 12. In that shown in FIGURE 11 the coils 4 and 5 are spaced by a spacer 50 to ensure that no current flows through the coil 5 unless it is within a region of high flux density. In that shown in FIGURE 12 the coil 5 is split in two halves, one which is wholly surrounded by the coil 4 and one which wholly surrounds the coil 4. This configuration is useful in certain circumstances.

In a modification all the components of the electrical circuit other than the battery are mounted on the balance wheel to which two connections are made through hairsprings. The stiffness of one of the hairsprings is preferably such that it has little effect on the motion of the balance wheel.

In another modification all the components of the electrical circuit are mounted on the balance wheel and its motion is regulated by a single hairspring.

Referring now to FIGURE 13 which shows an alternative circuit diagram, the instrument has only one coil (denoted as 4) and two hairsprings (denoted as 9 and 11). The coil 4 which is carried on the balance wheel 6, has one of its ends connected through the hairspring 11 to the negative terminal of the battery 13 having a potential difference across it of about 1.5 volts. The other end of the coil 4 is connected through the hairspring 9 to the collector of a p-n-p silicon transistor 38 and also to the base of a p-n-p silicon transistor 32 through a resistor 31. The collector of the transistor 32 is connected to the negative terminal of the battery 13 through a resistor 30 and to the base of the transistor 38 directly. The emitter terminals of transistors 32 and 38 are connected to the positive terminal of battery 13. In operation, in the periods when the E.M.F. is not induced in the coil 4, the current through the transistor 32 may conveniently be about $1\mu$ A. for a watch and that through the transistor 38 is negligible. When the coil 4 enters the gap 3 an E.M.F. is induced in it which makes the end connected to the hairspring 9 more positive. This E.M.F. is passed to the base of the transistor 32 and reduces the current flowing through the transistor 32 making the potential of its collector more negative. The potential of the base of the transistor 38 also becomes more negative causing current to flow through the transistor 38 and the coil 4. The current flowing through the coil 4 interacts with the flux in the gap 3 to produce a force in the sense to maintain the oscillations of the balance wheel. The average amplitude of the current may be $10\mu$ A. A more detailed description of the circuit operation is given later.

Referring now to FIGURE 14 which shows another alternative circuit similar to that of FIGURE 13, one end of the coil 4 is connected through the hairspring 11 to the negative terminal of the battery 13 having a potential difference across it of about 1.5 volts. The other end of the coil 4 is connected through the hairspring 9 to the collector of a p-n-p silicon transistor 36 and to the base of an n-p-n silicon transistor 37 through a resistor 33. The emitter of transistor 37 is connected to the negative terminal of the battery 13 and its collector is connected to the base of the transistor 36. The emitter of the transistor 36 is connected to the positive terminal of the battery 13.

In use, in the periods when the coil 4 lies outside the gap 3 negligible current flows through the transistors 36 and 37. When the coil 4 passes into the gap 3 an E.M.F. is induced in it which makes the potential of the end connected to the hairspring 9 more positive. The base of the transistor 37 also becomes more positive so that current can flow through the transistor 37. The transistor 37 then provides the base current for the transistor 36 so that current flows through the transistor 36 and the coil 4. The current flowing through the coil 4 interacts with the flux in the gap 3 to produce a force in the sense to maintain the oscillations of the balance wheel 6. The average amplitude of the current may be $10\mu$ A. A more detailed description of the circuit operation is given later.

Referring now to FIGURE 15 which shows another alternative circuit, one end of the coil 4 is connected through the hairspring 11 to the positive terminal of the battery 13. The other end of the coil 4 is connected through the hairspring 9 to the collector of an n-p-n silicon transistor 40. The collector of the transistor 40 is also connected through a resistor 41 to the base of an n-p-n silicon transistor 42. The collector of the transistor 42 is connected to the base of an n-p-n silicon transistor 44 directly and to the positive terminal of the battery 13 through a resistor 43. The collector and emitter of the transistor 44 are connected to the positive terminal of the battery 13 and to the base of the transistor 40 respectively. The emitters of the transistors 40 and 42 are connected to the negative terminal of the battery 13.

In use, in the periods in which the coil 4 lies outside the gap 3 current flows through the transistor 42 and its magnitude may conveniently be about ½μ A. Negligible current flows through the transistors 40 and 44 and the coil 4. When the coil 4 enters the gap 3 an E.M.F. is induced in it which makes the potential of the end connected to the hairspring 9 more negative. The potential of the base of the transistor 42 becomes more negative reducing the current through it and making the potential of its collector and that of the base of the transistor 44 more positive. Current flows through the transistor 44 which supplies base current to the transistor 40. Current therefore flows through the transistor 40 and the coil 4 and the current through the coil 4 interacts with the flux in the gap to produce a force in the sense to maintain the oscillations of the balance wheel 6. The average magnitude of the current pulse in the coil 4 may be 10μ A. It will be seen that the circuit of FIGURE 15 is similar to that of FIGURE 13 with the differences that the p-n-p transistors are replaced by n-p-n transistors and that an extra transistor 44 which acts as an emitter follower is incorporated. The transistors and resistors of the circuits shown in FIGURES 13, 14 and 15 can be formed as parts of integrated circuits. The circuits of FIGURES 13 and 15 are easier to fabricate as integrated circuits than that of FIGURE 14 as the transistors are all of the same type.

Referring now to FIGURE 16 which shows waveforms common to the three circuits shown in FIGURES 13, 14 and 15, curve F is a graph of the flux density in the gap 3. Curves G, H and I are graphs of the current in the coil 4 for various amplitudes of oscillations of the balance wheel 6.

The operation of the circuits of FIGS. 13 to 15 is as follows. As the coil 4 enters the gap 3 an E.M.F. is induced in it which has the same shape as the curve F (assuming, as is approximately true, the velocity of the coil 4 does not vary as it passes through the gap 3). The amplitude of the induced E.M.F. increases with increasing coil velocity and thus with increasing amplitude of oscillation of the balance wheel 6.

The polarity of the induced E.M.F. is such that it opposes the battery potential and thus the potential at the transistor end of the coil is reduced as the coil moves into the gap. When this potential reaches a predetermined value the circuit is actuated to cause an approximately constant current to be supplied to the base of the transistor connected to the coil. Collector current flows through the coil 4 which interacts with flux producing a force in the sense to maintain the oscillations of the balance wheel. The collector current flowing through the coil 4 produces a potential difference across the coil because of its resistance which reduces still further the potential of the end of the coil 4 connected to the transistor. The potential drop across the coil 4 due to the current flowing through (i.e. IR) is less than the E.M.F. induced in the coil 4. When the coil 4 moves out of the gap 3 and the induced E.M.F. is reduced, the potential drop remaining across the coil 4 due to its resistance and the current flowing through it is insufficient to maintain the circuit in its active state, that is, no base current is fed to the transistor whose collector is connected in series with the coil.

This low potential drop across the coil 4 due to the current flowing through it is achieved by the low resistance of the coil and by the small current passing through it. Both of these features are a result of the wide angle the gap 3 subtends about the axis of the balance wheel 6, because the coil may be wound with a relatively heavy gauge of wire to give a low resistance, the increased width of the coil limb being acceptable in the wide gap and the input energy to the balance is supplied over a relatively long period thus allowing a low power level and hence a small current through the coil 4. The magnitude of the current is proportional to the term $V-E$ so that the current is sensitive to changes of E (the E.M.F. induced in the coil). This is illustrated by the curves G, H and I which show the current waveforms for different amplitudes of oscillation as E is dependent on the amplitude of oscillation. As has been explained, the greater the change of energy input (which is dependent on the current) with a change of amplitude of oscillation, the smaller is the change in timekeeping due to alterations in the energy requirements of the instrument.

FIGURE 17 shows in Curve M the E.M.F. induced in the trigger coil 4 and the currents (Curves N, O, P) flowing in the drive coil 5 of a two coil horological instrument such as that of FIGURE 3. Curves F and M are identical but curves N, O, and P which show the current waveforms at oscillation amplitudes identical to those corresponding to curves G, H, and I respectively do not have "ears" 51 and 52 which are common to all three curves G, H, and I. These two ears are the result of the constant transistor base current giving large collector currents when the E.M.F. induced in the coil 4 is relatively small as it enters and leaves the gap 3, whereas in the circuit of FIG. 3 the transistor base current is reduced at these points so limiting the current through the coil 4.

I claim:

1. An electrically maintained balance comprising an inertial member mounted for rotational oscillations about an axis, with an amplitude of substantially 220°, a plurality of magnetic members positioned to form a magnetic circuit with a gap across which magnetic flux passes, first and second coils carried by the inertial member, said inertial member being so positioned that during its oscillations said first and second coils pass through said gap when voltage pulses are induced in said first and second coils, a direct voltage source, and circuit means operatively connected to said first and second coils and to said direct voltage source, said circuit means being constructed to permit current pulses from said direct voltage source to flow through said first coil in response to voltage pulses in said second coil, said current pulses and said magnetic flux interacting to produce impulses on said inertial member in the sense to maintain said oscillations; the dimensions and parameters of said first and second coils and the dimensions and parameters of said magnetic circuit being selected to cooperatively cause induction of voltage pulses in said first coil having a magnitude more than half that of the potential difference across said direct voltage source when said inertial member is oscillating normally through said amplitude of 220°.

2. The combination claimed in claim 1 wherein the path of said first and second coils through said gap subtends an agle of more than 20° about said axis.

3. The combination claimed in claim 1 wherein the average flux density in said gap is more than 4000 gauss.

4. The combination claimed in claim 1 wherein said second coil surrounds said first coil in the plane of their motion through said gap.

5. An electrically maintained balance comprising an inertial member mounted for rotational oscillations with an amplitude in the region of 220° about an axis, a plurality of magnetic members positioned to form a magnetic circuit with a gap across which magnetic flux passes, a coil carried by said inertial member, said inertial member being so positioned that during its oscillations said coil passes through said gap when voltage pulses are induced in said coil, a direct voltage source, and circuit means operatively connected to said coil and to said direct voltage source and constructed to permit current pulses from said direct voltage source to flow through the coil in response to said voltage pulses, said current pulses and said magnetic flux interacting to produce impulses on said inertial member in the sense to maintain said oscillations, said voltage pulses having a magnitude more than half that of the potential difference across said direct voltage source.

6. The combination claimed in claim 5 wherein the path of said coil through said gap subtends an angle of more than 20° about said axis.

7. The combination claimed in claim 5 wherein the average flux density in said gap is more than 4000 gauss.

8. The combination claimed in claim 5 wherein said circuit means is constructed to permit current to flow through said coil when and only when the potential difference across the coil is greater than a predetermined value, said predetermined value being greater than the product of the said current and the resistance of the coil.

9. The combination claimed in claim 5 wherein the circuit means comprise first and second transistors, said coil being connected as the load of said first transistor, the potential difference across said coil being applied to said second transistor, said second transistor being arranged to control the current through the first transistor.

10. An electrically maintained balance comprising balance means mounted for rotation about an axis and spring restrained towards a datum position so that it may oscillate about the datum position with an amplitude of substantially 220°, a coil assembly mounted on said balance means so that as said balance means oscillates the assembly has a path of movement which substantially lies in a surface of revolution about said axis, fixed magnetic means establishing a region of magnitic flux of at least 4000 gauss in which region the flux intersects said path of movement, the position of the coil assembly on the balance being such that when said balance means is in its datum position the coil assembly is symmertically placed with respect to the said region, the angular extent about the said axis of the portion of the said path within the said region being at least 50°, a direct voltage source, circuit means connecting the coil assembly to the voltage source, and means responsive to the angular position of said balance means for causing said circuit means to pass current pulses through the coil assembly when said coil assembly is passing through the said region so as to maintain the oscillations, the arrangement being such that the voltage pulses induced in the coil assembly by its movement through the said region have a magnitude more than half that of the potential difference across said direct voltage source.

References Cited

UNITED STATES PATENTS

| 3,118,098 | 1/1964 | Reich | 318—132 XR |
| 3,168,690 | 2/1965 | Lavet et al. | 318—132 XR |
| 2,907,940 | 10/1959 | Beyner | 318—132 |
| 2,974,265 | 3/1961 | Thoma | 318—132 |
| 3,046,460 | 7/1962 | Zemla | 318—132 |
| 3,061,796 | 10/1962 | Schoninger | 331—110 |
| 3,124,731 | 3/1964 | Eysen et al. | 310—36 XR |
| 3,184,669 | 5/1965 | Williams | 318—129 |

FOREIGN PATENTS

| 921,948 | 3/1963 | Great Britain. |

MILTON O. HIRSHFIELD, *Primary Examiner.*

D. F. DUGGAN, *Assistant Examiner.*